No. 743,679. PATENTED NOV. 10, 1903.
W. L. BEMIS.
EYEGLASSES.
APPLICATION FILED JULY 24, 1903.

NO MODEL.

Witnesses:
Nathan C. Lombard 2nd
George A. Brown

Inventor:
Wallace L. Bemis,
by N. C. Lombard
Atty.

THE NORRIS PETERS CO., PHOTO-LITHO., WASHINGTON, D. C.

No. 743,679.

Patented November 10, 1903.

UNITED STATES PATENT OFFICE.

WALLACE L. BEMIS, OF BROCKTON, MASSACHUSETTS.

EYEGLASSES.

SPECIFICATION forming part of Letters Patent No. 743,679, dated November 10, 1903.

Application filed July 24, 1903. Serial No. 166,785. (No model.)

*To all whom it may concern:*

Be it known that I, WALLACE L. BEMIS, of Brockton, in the county of Plymouth and State of Massachusetts, have invented certain new and useful Improvements in Eyeglasses, of which the following, taken in connection with the accompanying drawings, is a specification.

My invention relates to eyeglasses, and especially to the stud and clamps by which and the nose-spring the two lenses are connected together; and it consists in certain novel features of construction, arrangement, and combination of parts, which will be readily understood by reference to the description of the accompanying drawings and to the claims hereto appended and in which my invention is clearly pointed out.

Figure 1:
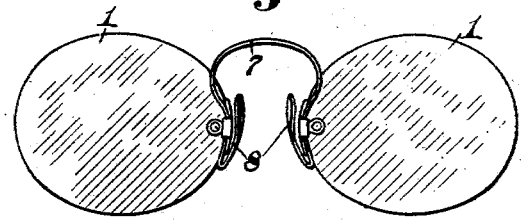
Figures 2, 3:
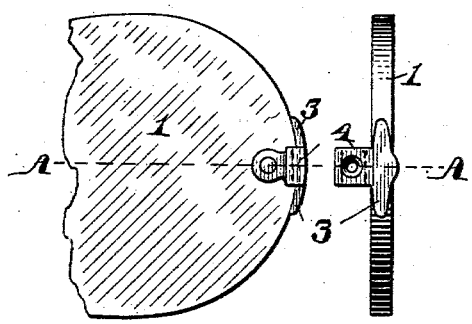
Figure 4:
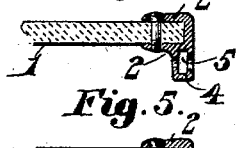
Figure 5:
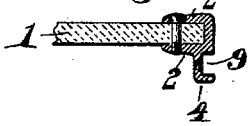

Figure 1 of the drawings is an inside elevation of a pair of eyeglasses embodying my invention. Fig. 2 is a similar elevation of a portion of one lens with the stud and clamp attached thereto. Fig. 3 is an edge view of the same. Fig. 4 is a section on line A A on Figs. 2 and 3; and Fig. 5 is a similar section, but showing a slightly-modified form of the stud. Figs. 2, 3, 4, and 5 are drawn to an enlarged scale.

In eyeglasses as heretofore constructed the studs to which the nose-guards and the nose-spring are attached have projected toward each other in a plane parallel to the face of the lenses, thereby necessarily increasing the distance between the centers of the lenses, which while it might be all right when used with small lenses is found to be objectionable when used with lenses having an increased area, as now very generally demanded, because of throwing the centers of the lenses too far apart; and the object of my invention is to obviate this objection, and to this end I construct the clamp and stud as illustrated in the accompanying drawings, in which 1 represents the lenses; 2, the clamp comprising two ears to embrace opposite sides of the lens and connected together by the strap 3, which is curved to fit the curved edge of the lens in a well-known manner.

The stud 4 projects from the ear of the clamp, which is in contact with the rear face of the lens and at a right angle to said rear face of the lens and is entirely within the outer edge of the strap 3, or, in other words, no parts of the two studs approach nearer to each other than do the straps 3.

The stud 4 may have formed therein a vertical mortise or slot 5, entirely back of the rear face of the lens, within which are fitted and secured by a suitable screw 6 one end of the nose-spring 7 and one end of the nose-guard 8, as shown in Fig. 1.

Instead of the mortise or slot 5 extending transversely through the stud, as shown in Fig. 4, an open groove 9 may be cut vertically through the side of said stud, which coincides with the outer curved edge of the strap 3, as shown in Fig. 5, and the ends of the spring and the nose-guard may be placed in said groove overlapping each other and secured therein by a suitable screw without departing from the principles of my invention. By this construction of the stud the adjacent edges of the two lenses may be brought nearer to each other than when the studs project from the outer face of the straps 3 toward each other in a plane parallel to the face of the lens, as is now generally practiced, which is a great advantage when applied to the lenses having largely-increased areas, which are now coming into very general use.

What I claim as new, and desire to secure by Letters Patent of the United States, is—

1. In an eyeglass the combination with a rimless lens, and a slotted clamp and a curved strap fitted to the inner edge of said lens and clamped thereto, of a stud projecting from said clamp and strap to the rear of the face of the lens and entirely within the outer edge of said strap or in such position relative thereto that no part of said stud shall be at a less distance from the opposite lens than the outer edge of said strap, and having formed therein a vertical slot to receive the ends of the nose spring and guard the broad side of said slot being in a plane at a right angle to plane of the rear face of the lens.

2. In an eyeglass the combination with the lens, and a slotted clamp and a curved strap fitted to the inner edge of said lens and firmly secured thereto, of a stud attached to and projecting from said clamp and strap to the rear of the face of said lens and entirely within the outer curved edge of said strap, or in such position relative thereto that no part of said stud shall be at a less distance from the opposite lens than the outer edge of said strap, said stud having a mortise-like slot cut transversely therethrough with its narrowest edges parallel to the face of the lens.

In testimony whereof I have signed my name to this specification, in the presence of two subscribing witnesses, on this 21st day of July, A. D. 1903.

WALLACE L. BEMIS.

Witnesses:
N. C. LOMBARD,
J. H. STEVENSON.